United States Patent
Polewarczyk

(10) Patent No.: US 7,246,847 B2
(45) Date of Patent: Jul. 24, 2007

(54) VEHICLE CLOSURE SYSTEM

(75) Inventor: Joseph Michael Polewarczyk, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 67 days.

(21) Appl. No.: 11/109,266

(22) Filed: Apr. 19, 2005

(65) Prior Publication Data

US 2006/0232099 A1   Oct. 19, 2006

(51) Int. Cl.
*B62D 33/06* (2006.01)

(52) U.S. Cl. .................................. 296/190.11

(58) Field of Classification Search ............ 296/146.1, 296/26.08, 147, 190.11, 26.11
See application file for complete search history.

(56) References Cited

U.S. PATENT DOCUMENTS

| | | | |
|---|---|---|---|
| 6,260,916 B1 * | 7/2001 | Hunt | 296/190.11 |
| 6,513,863 B1 | 2/2003 | Renke et al. | 296/190.11 |
| 6,520,562 B2 * | 2/2003 | Pyo | 296/183.1 |
| 6,544,043 B1 | 4/2003 | Smith | 439/34 |
| 6,786,535 B1 * | 9/2004 | Grzegorzewski et al. | 296/190.11 |
| 6,796,600 B1 * | 9/2004 | Ferer et al. | 296/146.1 |
| 6,837,529 B2 * | 1/2005 | Kharod et al. | 296/24.4 |
| 6,938,949 B1 * | 9/2005 | Peart | 296/190.08 |
| 7,036,872 B1 * | 5/2006 | Czirmer | 296/190.11 |
| 2002/0014785 A1 * | 2/2002 | Sotiroff et al. | 296/146.6 |
| 2002/0070582 A1 * | 6/2002 | Pyo | 296/146.2 |
| 2003/0122401 A1 * | 7/2003 | Hashimoto | 296/190.11 |
| 2005/0017545 A1 * | 1/2005 | Rudolph et al. | 296/190.11 |
| 2006/0076801 A1 * | 4/2006 | Czirmer | 296/190.11 |
| 2006/0076802 A1 * | 4/2006 | Voelkert | 296/190.11 |

* cited by examiner

*Primary Examiner*—H Gutman

(57) ABSTRACT

A vehicle closure system includes a first track portion rigidly connected with respect to a vehicle body and a second track portion rigidly connected with respect to a closure panel. The closure panel is selectively movable between open and closed positions. The first and second track portions align when the closure panel is in the closed position. The track portions facilitate movement of a window between a closed position and a stowed position, while allowing independent movement of the closure panel with respect to the window.

11 Claims, 3 Drawing Sheets

US 7,246,847 B2

VEHICLE CLOSURE SYSTEM

TECHNICAL FIELD

This invention relates to vehicle closure systems having a closure panel and a window member.

BACKGROUND OF THE INVENTION

Certain vehicles include vehicle body openings, such as between passenger spaces and cargo spaces, or between a vehicle interior space and the vehicle exterior. Vehicle tailgates and midgates often include a lower panel that is a metal or composite material, and a transparent window connected to the lower panel. The lower panel and the window cooperate to selectively obstruct the body opening. Typically, the lower panel is pivotable to an open position and the window is retractable into a cavity formed by the lower panel when the lower panel is moved to the open position.

An exemplary midgate is described in U.S. Pat. No. 6,513,863, issued Feb. 4, 2003 to Renke et al., and which is hereby incorporated by reference in its entirety. An exemplary tailgate is described in U.S. Pat. No. 6,544,043, issued Apr. 8, 2003 to Smith, and which is hereby incorporated by reference in its entirety.

SUMMARY OF THE INVENTION

A vehicle includes a vehicle body defining a body opening. A first track member defines a first track segment and is rigidly connected with respect to the vehicle body. A closure system for selectively obstructing the body opening includes a closure panel movably connected with respect to the vehicle body, a second track member defining a second track segment and rigidly connected with respect to the closure panel for movement therewith, a window member, and a window guide member rigidly connected with respect to the window member.

The closure system is selectively movable between a first configuration and a second configuration. In the first configuration, the closure panel is in a generally vertically oriented closed position to partially obstruct the body opening, the window member is generally vertically oriented to further obstruct the body opening, and the window guide member is at least partially in the first track segment. In the second configuration, the window guide is at least partially in the second track segment and not in the first track segment such that the window member is movable with the closure panel.

The vehicle provided enables independent movement of the closure panel and the window member. That is, when the closure system is in the first configuration, the window guide member is in the first track segment, which is rigidly connected with respect to the vehicle body. Accordingly, the closure panel is movable to its open position independently of the window member such that the window member remains in place and obstructs a portion of the body opening. The vehicle provided also enables the window member to be connected to the closure panel for movement therewith to a stowed position. That is, in the second configuration, the window guide member is in the second track segment, which is rigidly connected with respect to the closure panel. In a preferred embodiment, the window member is generally parallel to, and in juxtaposition with, the closure panel in the second configuration for compact stowage and movement with the closure panel to its closed position.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
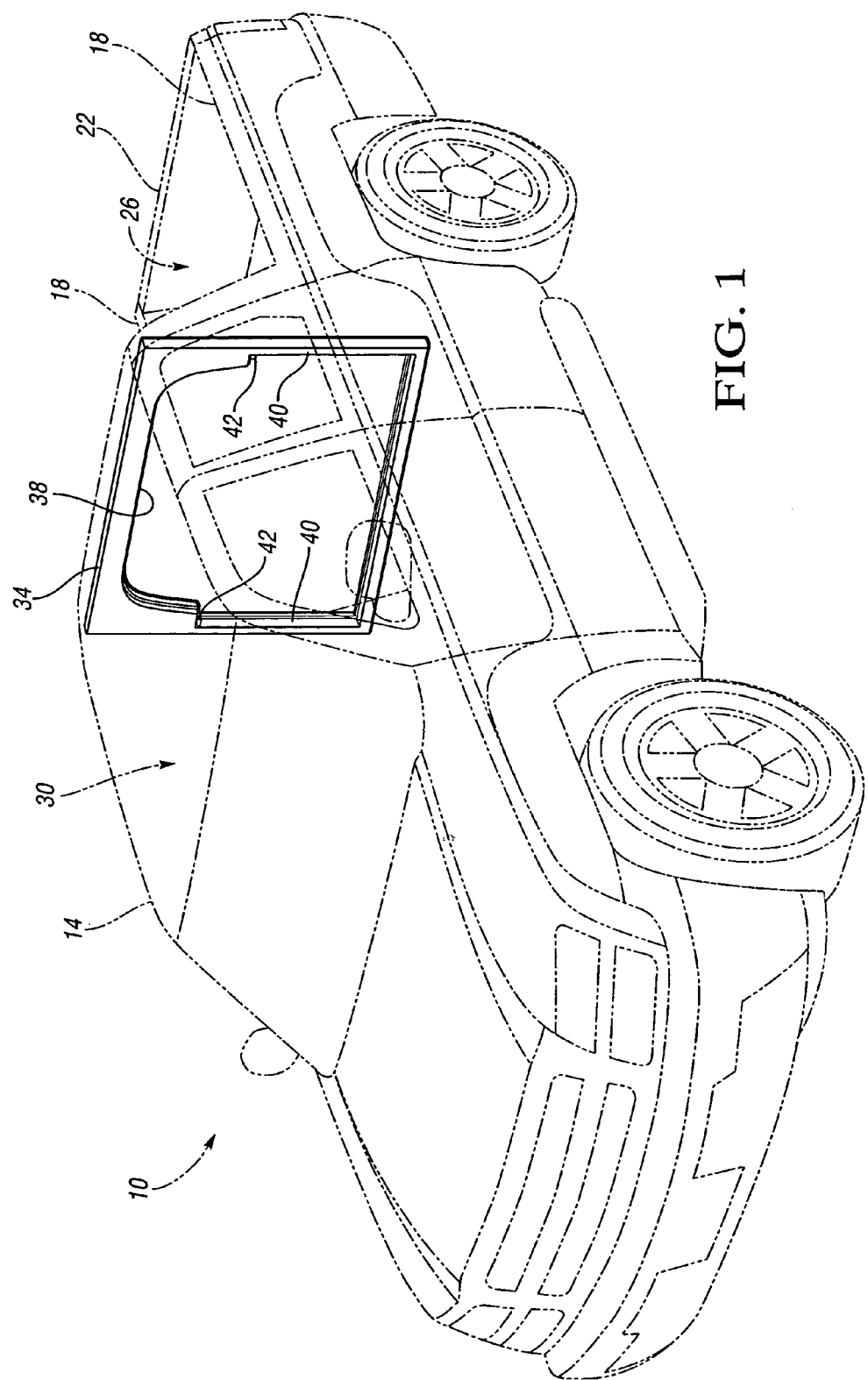
FIG. 1 is a schematic perspective view of a vehicle including a vehicle body defining an opening.

Referring to FIG. 1, a vehicle 10 includes a vehicle body 14. In the embodiment depicted, the vehicle body 14 has a pickup truck style, and includes two pickup truck cargo box sidewalls 18 and a pivotable tailgate 22 that cooperate to at least partially define a cargo area 26. The vehicle body 14 also defines a passenger compartment 30 forward of the cargo area 26. The body 14 includes a midgate frame 34 that defines a midgate opening 38 that, when unobstructed, provides access between the passenger compartment 30 and the cargo area 26. The frame 34 is characterized by two generally vertically oriented segments 40 that at least partially define the lateral edges of the midgate opening 38. Each of the segments 40 has a track member 42 rigidly mounted thereto.

Figure 2:
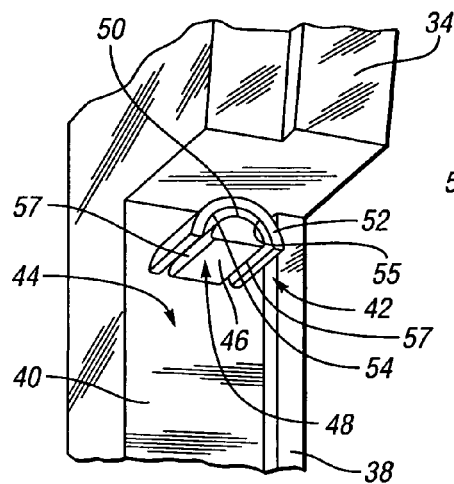
FIG. 2 is a schematic perspective view of a track member on the vehicle body of FIG. 1.

Referring to FIG. 2, wherein like reference numbers refer to like components from FIG. 1, one of the track members 42 is schematically depicted. The track member 42 depicted in FIG. 2 is representative of both the track members shown in FIG. 1. Track member 42 extends inboard from the surrounding surface 44 of frame segment 40 and includes a pin 46 that partially defines a cylinder. In the embodiment depicted, pin 46 is semi-cylindrical and includes a mating surface 48 facing generally downward and a curved surface 50. Track member 42 also includes a semi-annular protrusion 52 characterized by a semiannular inner surface 54 that opposes, or is in juxtaposition with, curved surface 50. Surfaces 50 and 54 cooperate to define a semi-annular slot 55 which functions as a first track segment. The track member 42 defines two slot openings 57.

Figure 3:
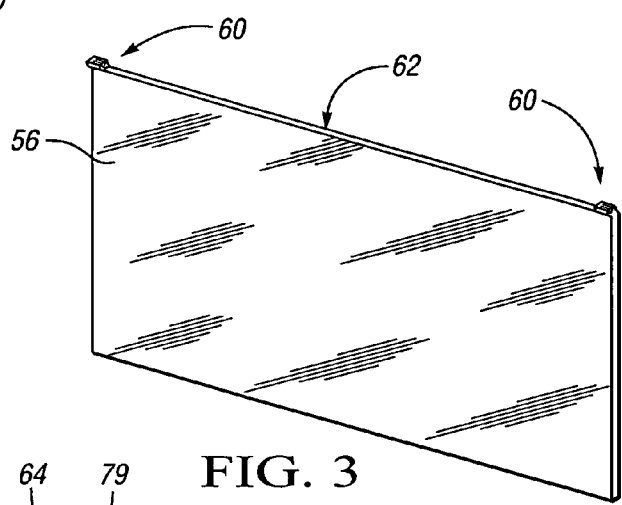
FIG. 3 is a schematic perspective view of a closure panel.
Figure 4:
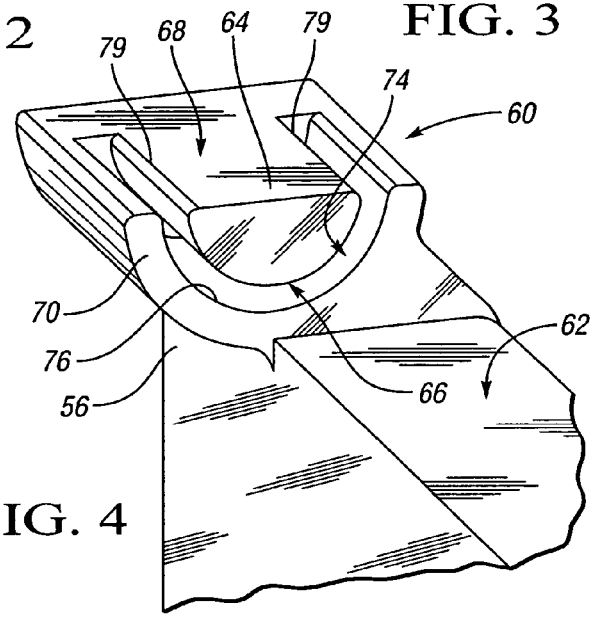
FIG. 4 is a schematic perspective view of a track member on the closure panel of FIG. 3.

Referring to FIG. 3, a closure panel 56 is schematically depicted. The closure panel 56 includes two track members 60 at the lateral edges of the upper surface 62 of the panel 56. Referring to FIG. 4, wherein like reference numbers refer to like components from FIG. 3, the track member 60 is representative of both track members shown in FIG. 3. Track member 60 extends upward from surface 62 and includes a pin 64 forming a portion of a cylinder. In the embodiment depicted, pin 64 is semicylindrical. Pin 64 includes curved surface 66 and mating surface 68. Track member 60 also includes a portion 70 that defines a semi-annular surface 74 that opposes, or is in juxtaposition with, surface 66. Surfaces 66 and 74 cooperate to define a semi-annular slot 76 which functions as a second track segment. Track member 60 defines two slot openings 79.

Figure 5:
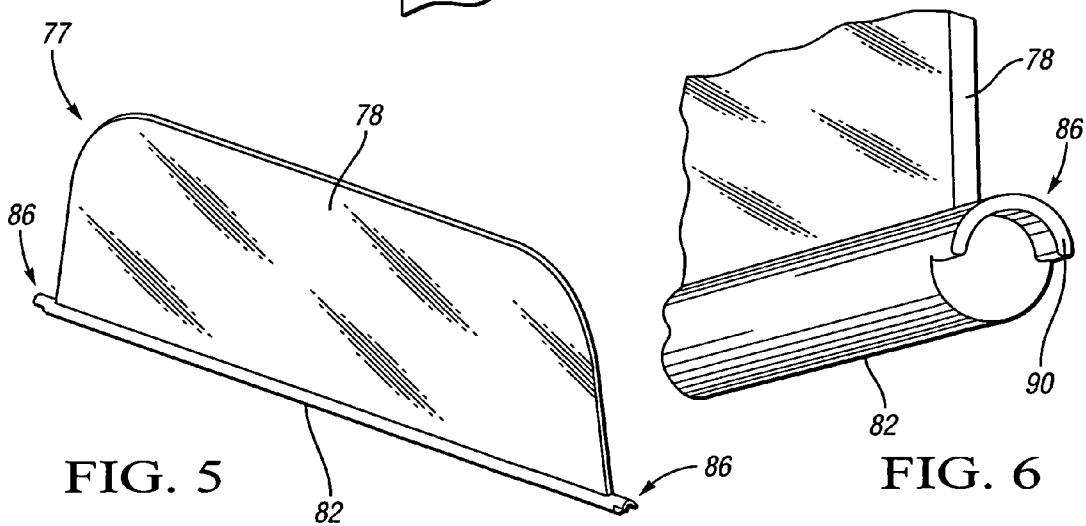
FIG. 5 is a schematic perspective view of a window assembly.
Figure 6:
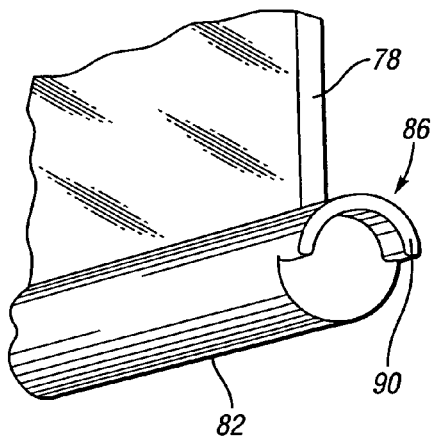
FIG. 6 is a schematic perspective view of a window guide member on the window assembly of FIG. 5.

Referring to FIG. 5, a glass window assembly 77 is schematically depicted. Glass window assembly 77 includes a glass window 78 and a support member, such as rod 82, that is affixed to the lower edge of the window 78. Although the support member in the embodiment depicted is cylindrical, it may be desirable for the support member to provide a flat surface to press against a seal (not shown) between the window assembly 77 and the closure panel (shown at 56 in FIG. 3). Window guides 86 are located at opposite ends of rod 82. FIG. 6, wherein like reference numbers refer to like components from FIG. 5, schematically depicts a window guide 86 that is representative of both window guides shown in FIG. 5. Window guide 86 includes semi-annular protrusion 90.

Figure 7:
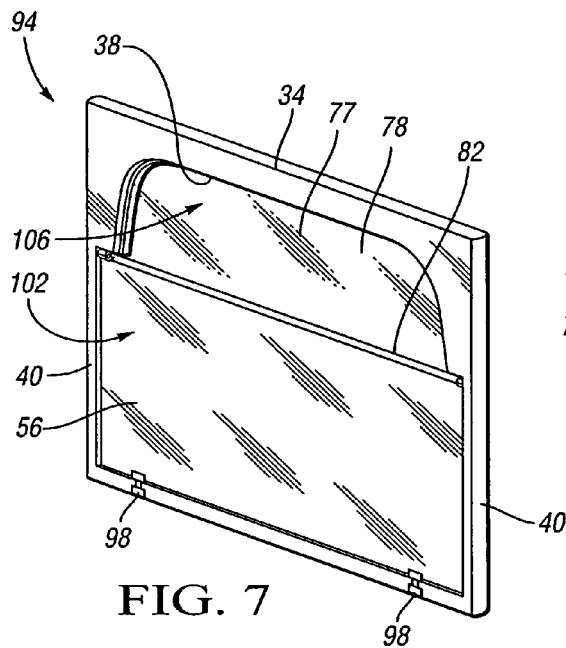
FIG. 7 is a schematic perspective view of the closure panel and window assembly forming a closure system in a first configuration.

Referring to FIG. 7, wherein like reference numbers refer to like components from FIGS. 1-6, a closure system 94 includes the midgate frame 34, the closure panel 56, and the window assembly 77. Closure panel 56 is rotatably or pivotably mounted with respect to the frame 34 via hinges 98. The closure panel 56 is shown in a closed position in which it is generally vertically oriented and obstructs the lower portion of the midgate opening 38. The window assembly 77 is shown in a closed position in which it is generally vertically oriented and obstructs the upper portion of the midgate opening 38. The closure panel 56 and the window assembly 77 cooperate to substantially entirely obstruct the midgate opening 38 in their respective closed positions. Those skilled in the art will recognize that weather strips and seals are preferably employed around the periphery of the body opening 38. Panel 56 defines surface 102, which faces the passenger compartment, shown at 30 in FIG. 1, when panel 56 is in its closed position. Window 78 defines surface 106, which also faces the passenger compartment when the window is in its closed position.

Figure 8:
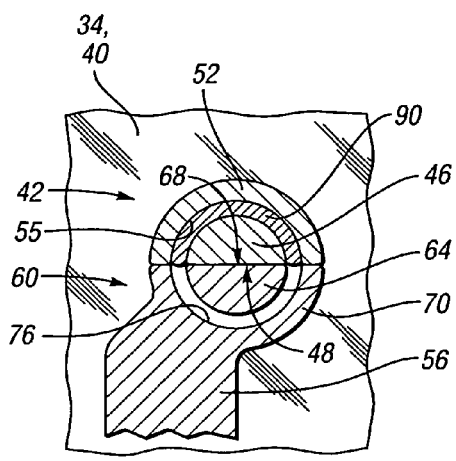
FIG. 8 is a schematic, sectional view of the track member of FIG. 4, the track member of FIG. 2, and the window guide member of FIG. 6 when the closure system is in the first configuration.

Referring to FIG. 8, wherein like reference numbers refer to like components from FIGS. 1-7, when the closure panel and the window assembly are in their respective closed positions as shown in FIG. 7, the track members 60 on the closure panel 56 align with respective track members 42 on the midgate frame 34 such that pin 46 and pin 64 align to form a cylinder. More specifically, in the embodiment depicted, the mating surface 68 opposes or abuts mating surface 48, and semi-annular slot 76 cooperates with semi-annular slot 55 to form an annular track. When the window is in the closed position, window guide protrusion 90 is at least partially located within slot 55 and no part of window guide protrusion 90 is within slot 76. Pins 46 support the window assembly including the rod and the window glass. Ancillary fastening devices (not shown) such as latches are employed to further retain the glass and the panel 56 in their respective closed positions.

Mating surfaces 48 and 68 are depicted as being flat; however, it may be desirable for the surfaces 48, 68 to be curved if necessary to avoid interference during relative movement of the closure panel 56 with respect to the frame 34. For example, it may be desirable for surface 68 to be concave and surface 48 to be convex, each having a radius approximately equal to the distance from the hinge pivot to the mating surfaces.

Figure 9:
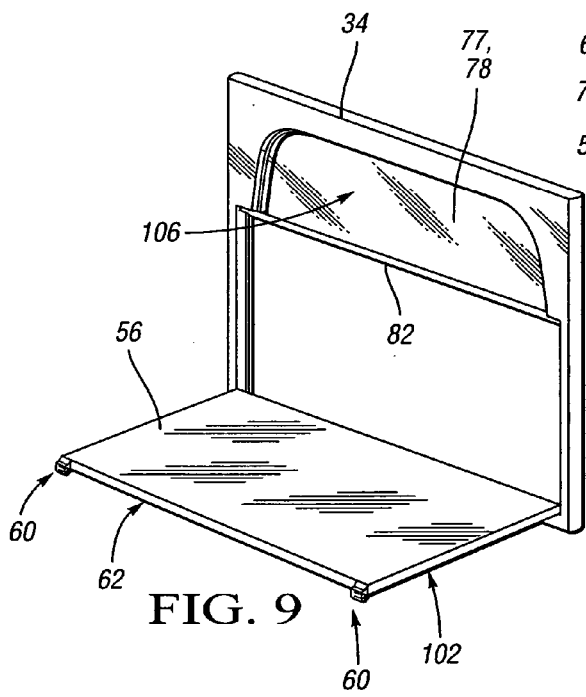
FIG. 9 is a schematic perspective view of the closure system of FIG. 7 with the closure panel in an open position.

Referring to FIG. 9, wherein like reference numbers refer to like components from FIGS. 1-8, the closure panel 56 is pivotable about the hinges to an open position wherein the panel 56 is generally horizontally oriented and surface 102 faces downward. Substantially all of the lower portion of the opening 38 is unobstructed to accommodate cargo that may extend through the opening 38. The window assembly 77 is in the closed position, supported by the pins shown at 46 in FIG. 8.

Figure 10:
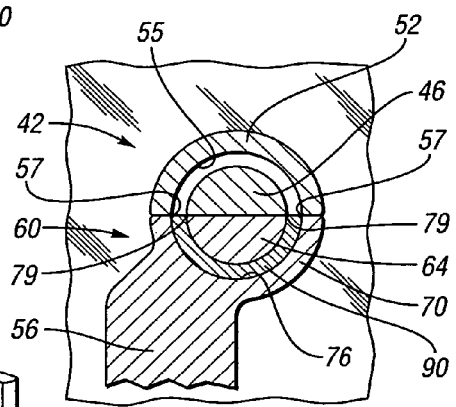
FIG. 10 is a schematic, sectional view of the track member of FIG. 4, the track member of FIG. 2, and the window guide member of FIG. 6 when the closure system is in a second configuration.

Referring to FIG. 10, wherein like reference numbers refer to like components from FIGS. 1-9, when closure panel 56 is in the closed position, the rod and window are rotatable approximately 180 degrees from the closed position to an open position. More specifically, window guide protrusion 90 is rotated about pins 46 and 64 through the annular track defined by slots 55 and 76 so that the window guide protrusion 90 is at least partially within semi-annular slot 76 and no part of the window guide protrusion 90 is in semi-annular slot 55. Slot openings 57 and 79 align to enable movement of the window guide 90 from slot 55 to slot 76. The rod and window glass are supported by portion 70 via window guide 90 in the open position so that the window assembly is movable with the closure panel 56.

Figure 11:
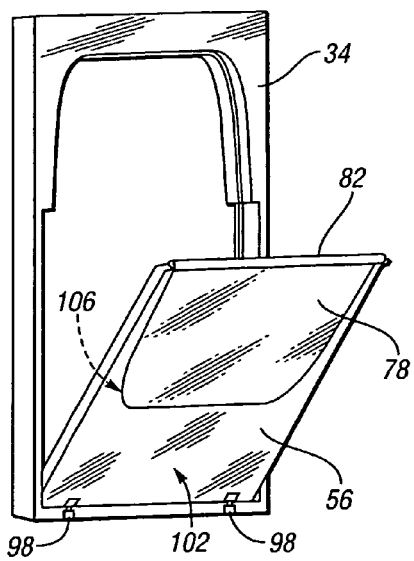
FIG. 11 is a schematic perspective view of the closure system with the window member in a stowed position with respect to the closure member.

Referring to FIG. 11, wherein like reference numbers refer to like components from FIGS. 1-10, the glass window 78 is in a stowage position with respect to the panel 56, wherein the window 78 is juxtaposed with the closure panel 56, and is movable with the closure panel to the closure panel's open position. More specifically, surface 106 and 102 oppose one another. Clips or other fastening devices (not shown) are employed to prevent rotation of window 78 with respect to panel 56.

Although the closure system shown and described is a vehicle midgate, the closure system may be a tailgate for the rear opening of a van, sport-utility vehicle, etc., within the scope of the claimed invention.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a vehicle body defining a body opening;
   a first track member defining a first track segment and rigidly connected with respect to the vehicle body;
   a closure system including
      a closure panel movably connected with respect to the vehicle body;
      a second track member defining a second track segment and rigidly connected with respect to the closure panel for movement therewith;
      a window member; and
      a window guide member rigidly connected with respect to the window member;

wherein the window member is selectively rotatable such that the closure system is selectively movable between
  a first configuration in which the closure panel is in a generally vertically oriented closed position to partially obstruct the body opening, the window member is generally vertically oriented to further obstruct the body opening, and the window guide member is at least partially in the first track segment, and
  a second configuration in which the window guide member is at least partially in the second track segment and not in the first track segment such that the window member is movable with the closure panel.

2. The vehicle of claim 1, wherein the closure system is selectively movable to a third configuration in which the closure panel is generally horizontally oriented and the window member is generally vertically oriented and the window guide member is at least partially in the first track segment and not the second track segment.

3. The vehicle of claim 2, wherein the first track member includes a first portion partially defining a first curved surface, and a second portion defining a second curved surface opposing the first curved surface, and wherein the first curved surface and the second curved surface define the first track segment therebetween.

4. The vehicle of claim 3, wherein the second track member includes a third portion defining a third curved surface, and a fourth portion defining a fourth curved surfacing opposing the third curved surface, and wherein the third curved surface and the fourth curved surface define the second track segment therebetween.

5. The vehicle of claim 4, wherein the first track member defines a first track segment opening; wherein the second track member defines a second track segment opening; and wherein the first and second track segment openings align when the closure panel is in the closed position to enable the window guide member to move from the first track segment to the second track segment.

6. The vehicle of claim 5, wherein the first portion defines a first partial cylinder and a first mating surface; and wherein the third portion defines a second partial cylinder and a second mating surface; and wherein the first and second mating surfaces substantially abut one another when the closure panel is in the closed position.

7. The vehicle of claim 1, wherein the window member includes a first surface; wherein the closure panel includes a second surface; and wherein the first surface and the second surface face the same direction when the closure system is in the first configuration, and wherein the first and second surfaces are in juxtaposition with one another when the closure system is in the second configuration.

8. A vehicle body characterized by a body opening, the vehicle body comprising:
  a first track member rigidly connected with respect to the body opening and defining a first partially annular slot;
  a closure panel selectively movable between a closed position in which the closure panel is generally vertically oriented to partially obstruct the body opening and an open position in which the closure panel is generally horizontally oriented;
  a second track member rigidly connected with respect to the closure panel for movement therewith, the second track member defining a second partially annular slot;
  wherein the first and second track members are sufficiently positioned to align with one another when the closure panel is in the closed position such that the first and second partially annular slots cooperate to define an annular track.

9. The vehicle body of claim 8, further comprising a window member and a window guide member rigidly connected with respect to the window member; and wherein the window member is selectively rotatable, when the closure panel is in the closed position, between a first position in which the window guide member is at least partially contained within the first partially annular slot and a second position in which the window guide member is at least partially contained within the second partially annular slot.

10. The vehicle body of claim 9, wherein the first track member includes a first portion at least partially defining a cylinder with a first curved surface and a first mating surface; wherein the second track member includes a second portion at least partially defining a cylinder with a second curved surface and a second mating surface; and wherein the first portion at least partially supports the window member when the window member is in the first position.

11. A vehicle comprising:
  a vehicle body defining a body opening;
  a first track member defining a first track segment and rigidly connected with respect to the vehicle body;
  a closure system including
    a closure panel movably connected with respect to the vehicle body;
    a second track member defining a second track segment and rigidly connected with respect to the closure panel for movement therewith;
    a window member; and
    a window guide member rigidly connected with respect to the window member;
  wherein the closure system is selectively movable between
    a first configuration in which the closure panel is in a generally vertically oriented closed position to partially obstruct the body opening, the window member is generally vertically oriented to further obstruct the body opening, and the window guide member is at least partially in the first track segment,
    a second configuration in which the window member is rotated downward to be generally parallel to and in juxtaposition with the closure panel such that the window guide member is at least partially in the second track segment and not in the first track segment and the window member is movable with the closure panel, and
    a third configuration in which the closure panel is generally horizontally oriented and the window member is generally vertically oriented and the window guide member is at least partially in the first track segment and not the second track segment.

* * * * *